Sept. 4, 1951        A. ROBERTSON        2,566,907
MIXER BEATER EJECTOR
Filed May 27, 1950        2 Sheets-Sheet 2
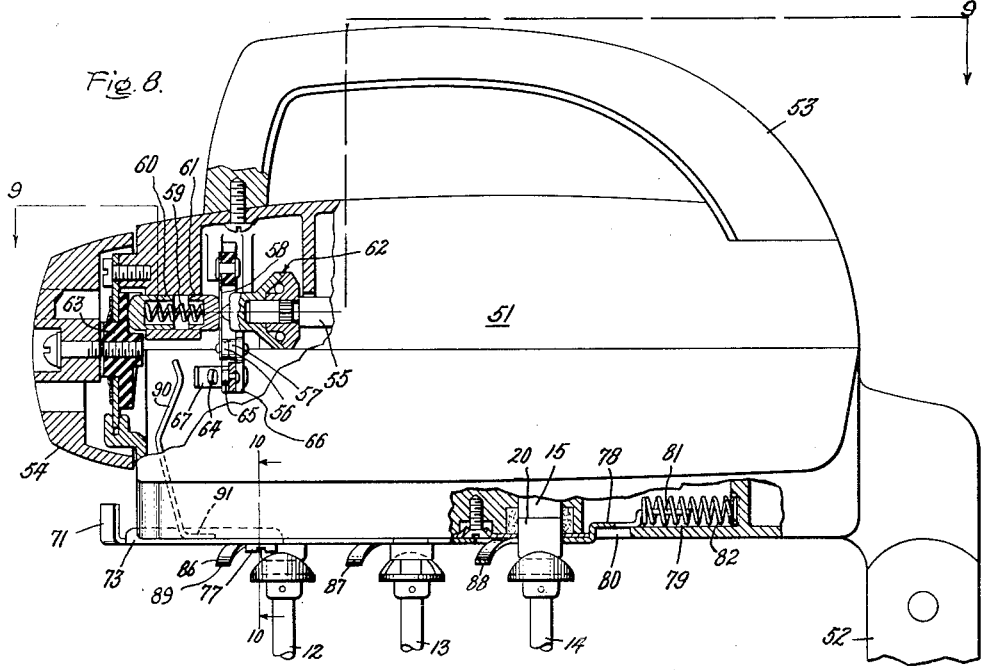
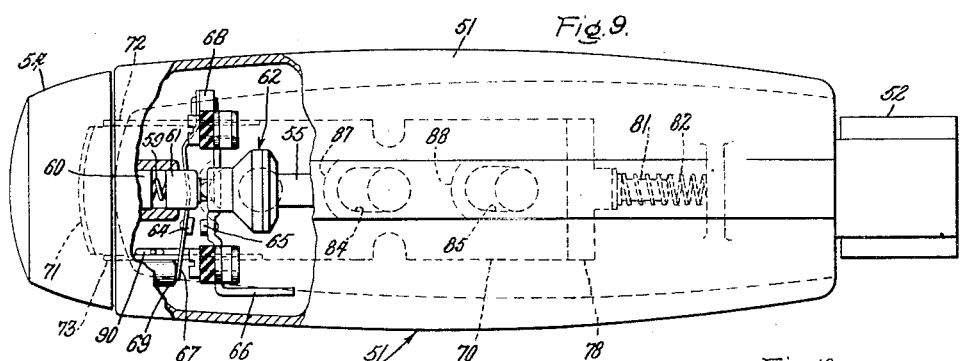
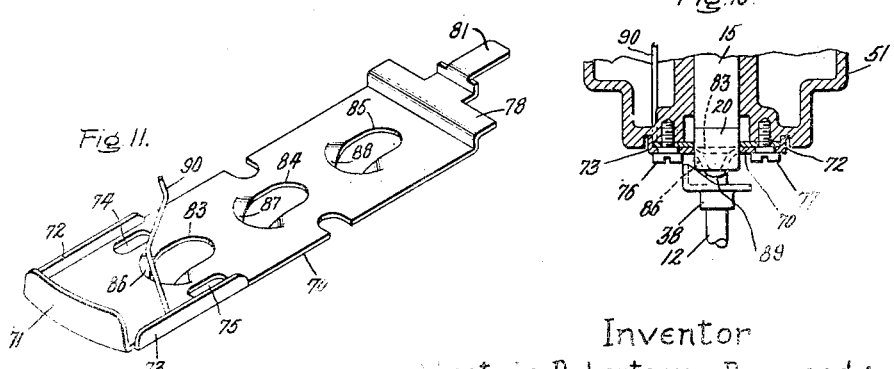
Inventor
Alastair Robertson, Deceased;
William A. Robertson, Executor;
by
His Attorney.

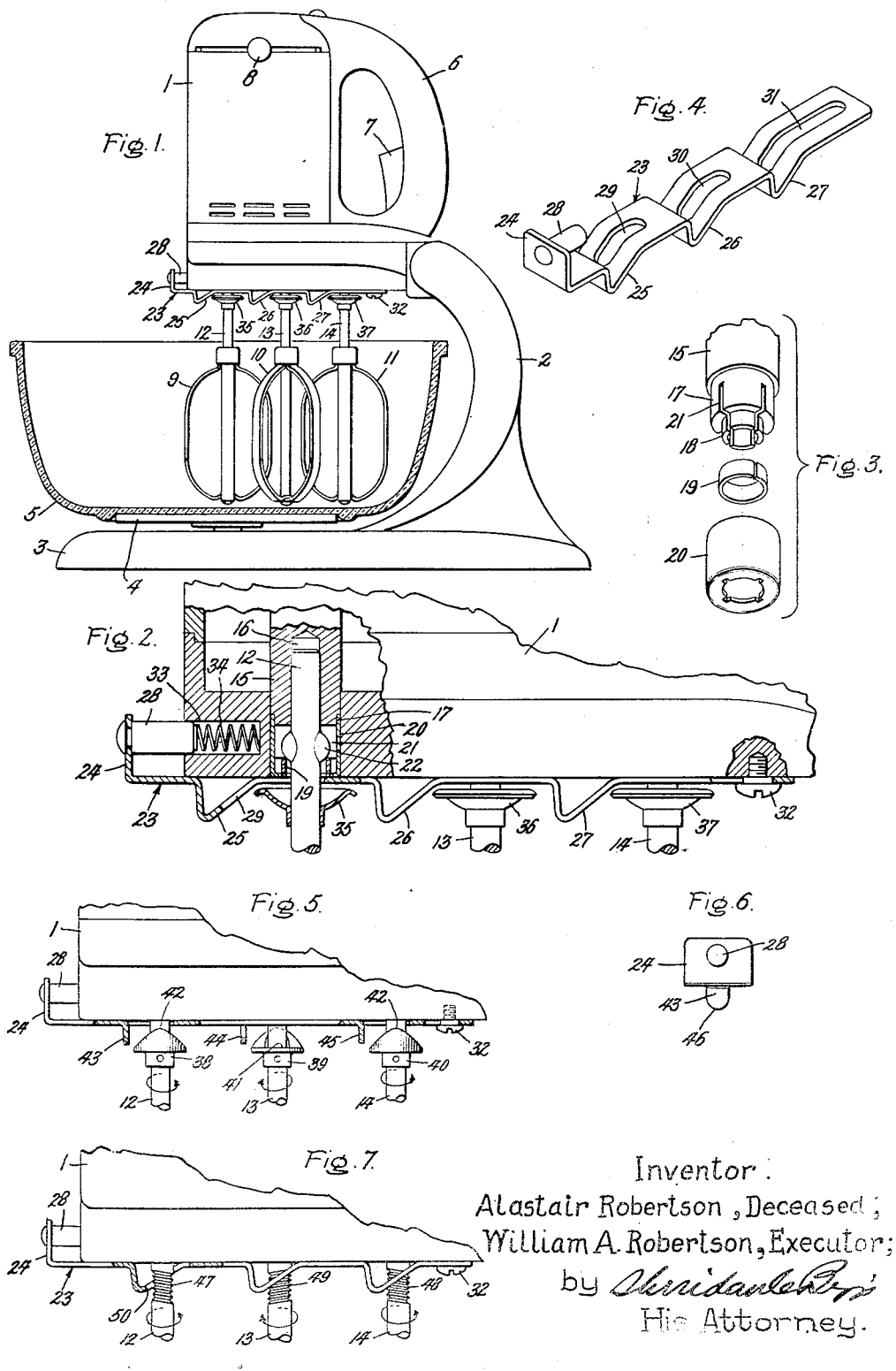

Patented Sept. 4, 1951

2,566,907

UNITED STATES PATENT OFFICE 2,566,907

MIXER BEATER EJECTOR

Alastair Robertson, deceased, late of Monroe, Conn., by William A. Robertson, executor, Ridgefield, Conn., assignor to General Electric Company, a corporation of New York Application May 27, 1950, Serial No. 164,743

11 Claims. (Cl. 259—1)

This invention relates generally to food or drink mixers, and more particularly to an ejector arrangement for detaching the beaters from the power unit of the mixer.

Electric food mixers, drink mixers, and the like usually include a suitable power unit and one or more beater elements carried on the lower end of a shaft which extends downwardly from the power unit. The beater elements should be detachable from the power unit to permit cleaning, substitution of different mixing tools, replacement, and other purposes; but, at the same time, it is necessary that the beaters be attachable to the power unit so that they will remain in operative driving relation under all conditions until they are purposely removed.

A primary object of the present invention is to provide an arrangement facilitating removal of the beaters from the power unit of the mixer.

A further object of the invention is to provide a beater ejector operable to release the beater elements by a simple manual motion, and without soiling the hands.

Still a further object of the invention is to provide such a beater ejector which may be easily and inexpensively installed on conventional type household mixers.

In accomplishment of the foregoing objective, a feature of the invention consists in attaching to the mixer power unit a plate member having portions cooperating with members affixed to the beater shafts, so that upon a lateral sliding movement of the plate with respect to the power unit the beater shafts are cammed outwardly and thus detached from the power unit. A further feature of the invention consists in arranging the ejector plate in cooperation with the power unit so that the power unit provides the motive force for ejecting the beaters.

Further features, objects, and advantages of the invention may be better understood from the following description taken in connection with the accompanying drawings, and its scope is pointed out with particularity in the appended claims.

Referring to the drawings, Fig. 1 is a side elevation of a household mixer embodying one form of the invention; Fig. 2 is a view on a larger scale, partially in section, of a portion of the device shown by Fig. 1; Fig. 3 is an exploded view of a detail of the device shown by Figs. 1 and 2; Fig. 4 is a perspective view of the beater ejector plate shown in Figs. 1 and 2; Fig. 5 is a partial side elevation, partially in section, showing an alternate form of the invention; Fig. 6 is a front elevation of the ejector plate shown in Fig. 5; Fig. 7 is a side elevation, partially in section, of a portion of a mixer showing another embodiment of the invention; Fig. 8 is a side elevation, partially in section, of a further form of the invention as applied to a mixer of a modified design; Fig. 9 is a plan view, partially in section, taken on the line 9—9 of Fig. 8; Fig. 10 is a partial cross-sectional view taken on the line 10—10 of Fig. 8; and Fig. 11 is a perspective view of the ejector plate as applied to the embodiment illustrated by Figs. 8 through 10.

The embodiments of the invention shown by Figs. 1 through 7 may be applied to a conventional household mixer, here shown in Fig. 1 as including a power unit 1, carried by a supporting arm 2 which blends into and forms a part of a mixer base 3. The mixer base includes a suitable turntable 4 for rotatably supporting a mixing bowl 5. The power unit may be provided additionally with a handle 6 with a latch operating member 7 for detaching power unit 1 from support 2. A speed adjustment knob 8, included at a convenient point on the power unit, permits selection of various speeds suitable for mixing operations. The power unit provides motive power for rotation of one or more beater elements. In the present embodiment, three such beater elements, 9, 10 and 11, are shown, with each beater affixed to a respective one of shafts 12, 13 and 14. The power unit, of course, contains a suitable electric motor (not shown) for rotating the shafts and their associated beater elements.

For normal mixer operation, the beaters must be retained in operative driving relation with the power unit. This result may be accomplished in a number of different ways, a typical arrangement being illustrated by Figs. 2 and 3. The power unit includes a plurality of spindles which are rotated when the mixer is in operation. One such spindle, 15, is shown in Figs. 2 and 3. It will be understood, of course, that the remaining spindles may be identical with the spindle here described. Each spindle 15 of a cylindrical form is axially recessed as at 16 to receive the upper end of a beater shaft, such as 12. As shown more clearly in Fig. 3, spindle 15 is reduced in diameter at 17 adjacent its lower end and the lower extremity is further reduced in diameter to form the neck portion 18. A resilient split ring 19 is adapted to slide over neck portion 18, with a collar 20 encompassing intermediate portion 17 as well as the neck portion and the resilient ring. Collar 20 is, of course, secured to spindle 15. This assembly, shown in exploded form by Fig. 3, is rotatably mounted within the casing forming power unit 1 and is driven by the power unit. In addition, the lower end of each spindle is slotted, for example in quadrature, as shown at 21. Adjacent the upper end of each beater shaft, laterally extending ears 22 are pinched from the material forming the beater shaft. These ears 22 are adapted to be received within slots 21 so that rotation of spindle 15 drives the beater shaft. With this construction, a beater shaft may be inserted into a spindle socket or recess 16 by forcing the shaft upwardly into the socket, at which time ears 22 cause an expansion of resilient ring 19. After the ears have moved upwardly in slots 21 past ring 19, the ring again contracts and retains the shaft in operative driving relation with the spindle. Thereafter, the shaft may be withdrawn only by forcing it downwardly to again expand ring 19 to permit passage of the laterally extending ears.

While the beaters can be inserted into the spindle sockets with comparative ease, it is found that removal of the beaters is relatively difficult. For that reason, the present invention is directed toward an arrangement for releasing each beater shaft from its corresponding spring retaining means and thereafter removing the beaters from the power unit. One form of the invention is illustrated by Figs. 1, 2 and 4, in which an ejector plate 23 is slidably mounted on the under surface of the power unit for cooperation with members affixed to each beater shaft. As shown in Fig. 4, ejecter plate 23 is fabricated from material, such as sheet steel, cut into an elongated strip. This strip is deformed to provide an upwardly extending finger operating portion 24 and a plurality of sloping surfaces 25, 26 and 27, the number of such surfaces corresponding to the number of beaters for any particular mixer. In addition, ejector plate 23 includes a plurality of elongated apertures 29, 30, and 31, through which the beater shafts may extend. Secured to finger operating flange 24 is a pin 28 for properly supporting and aligning the lefthand end of the ejector plate. The opposite end of the ejector plate includes the extra long aperture 31 (see Fig. 4) to facilitate the slidable mounting of the ejector plate on the under surface of the power unit. Assembly of the ejector plate on the power unit is clear from Fig. 2, illustrating a shouldered screw 32 extending through the end portion of slot 31 into the casing of the power unit. The power unit casing is recessed at 33 to receive pin 28. This recess also receives a resilient element, such as a coiled spring 34, to retain the ejector plate in its normal inoperative position.

Each of the beater shafts has secured thereto adjacent the ejector plate an annular flanged member, these members being designated 35, 36 and 37 respectively, for the shafts 12, 13 and 14. Each of these annular flanged members includes a rolled edge adapted to be engaged by a sloping surface of the ejector plate. With this arrangement, it may be seen that the surfaces 25, 26 and 27 act as cam surfaces, and the corresponding annular flanged members 35, 36 and 37 serve as cam followers; whereby a lateral movement to the right of ejector plate 23 forces the beater shafts downwardly until the lateral ears 22 on each shaft have passed respective resilient locking rings 19. Thereafter, the beater elements are readily removed from the power unit. Upon release of the ejector plate, spring 34 returns it to its normal position, where it interferes in no way with normal operation of the mixer.

From the above description of the embodiment illustrated by Fig. 2, it is seen that the beaters are ejected entirely by manual pressure on the ejector plate, and preferably when the beaters are being ejected, the power unit of the mixer is inoperative. In the embodiment illustrated by Figs. 5 and 6, the power unit is used as an aid in releasing the beater elements from the retaining means included in each spindle. Referring now to Fig. 5, cam members 38, 39 and 40 are attached to respective beater shafts. Preferably, each of these cam members is affixed to its shaft by a pin so that the member may not rotate with respect to the shaft. As shown, each of these members is provided with a sloping upper surface starting at a low point 41, as shown on the center shaft of Fig. 5, and sloping upwardly to a high point 42, as shown on either of the members attached to the outer shafts. The ejector plate 23 in this embodiment is attached to the power unit in the same manner as in the previous embodiment, employing a screw 32 at the righthand end, and pin 28 at the lefthand end. Similarly, as in the prior embodiment, a suitable resilient means may be employed in connection with the power unit and pin 28 to retain the ejector plate in the normally inoperative position. However, in this instance, the ejector plate includes a plurality of downwardly extending tongues 43, 44 and 45 struck up from the material forming the ejector plate. As shown in Fig. 6, the lower end of each of these tongues is rounded as at 46 for proper engagement with the camming surfaces on the members affixed to the beater shafts. Thus, with this arrangement, to remove the beater elements from the power unit, the operator first turns the power unit on to its lowest speed. Then, by pressing on the finger operating portion 24 of the ejector plate, this plate is moved laterally to the right, at which time the projecting tongues engage the cam sloping surfaces on the members affixed to the beater shafts. Rotation of the beater shafts forces them downwardly, thus disengaging the shafts from the retaining means included with each spindle. As may be seen in this embodiment, the cam surface for each shaft is formed on the member affixed to the shaft, and the cam follower is provided by the projecting tongue on the ejector plate. It may be noted in connection with both of the above described embodiments that the members affixed to the respective beater shafts serve the additional function of shielding the spindles from the entrance of batter or other material which is being mixed.

In Fig. 7 has been shown another embodiment of the invention which employs motive power of the mixer's power unit for ejecting the beater elements. Again, for convenience, there has been used the same numbers to indicate similar parts, the power unit 1 having an ejector plate 23 slidably attached thereto, as in the previous embodiment. However, in this arrangement, rather than employing a separate member affixed to each of the shafts, a portion of each shaft is threaded adjacent the position occupied by the ejector plate. As is well known in the art, household mixers commonly employ a gear drive from the motor of the power unit, and for this reason there has been shown the two outer beater shafts as rotating in an opposite direction from the center beater shaft. By way of example, there has been shown shafts 12 and 14 as provided with lefthand threads 47 and 48 respectively. Correspondingly, the center beater shaft 13 includes a righthand thread 49. The cam follower portion of the ejector plate in this instance comprises a thread engaging portion 50 adjacent each shaft. In the normal position of the ejector plate under the influence of the resilient means between pin 28 and the casing of the power unit as explained above, thread engaging portion 50 for each of the shafts is clear of the threaded portion of the shaft, and hence the ejector plate interferes in no way with the normal mixer operation. However, by pressing on the finger operating portion 24, ejector plate 23 is moved laterally to the right whereby the thread engaging portions or tongues on the ejector plate engage the threaded portions on corresponding beater shafts. Therefore, when the power unit is operating, preferably at a low speed, the beater shafts will be ejected from the spindles of the power unit. In this instance, therefore, the cam surface for each of the beater shafts is provided by the threaded portion, and the cam follower in each case is the projecting tongue on the ejector plate which is positioned adjacent to the beater shaft.

In connection with the embodiments illustrated and described in connection with Figs. 5, 6 and 7, it may be noted that three separate manual operations are involved in order to eject the beaters. As a first step, it is necessary to turn on the power unit to its lowest speed; then the ejector plate is moved laterally to engage the cam follower with the cam surface, whereupon the beaters are ejected from their locking engagement with the power unit spindle; finally, it is necessary to turn off the power unit. Because of the inconvenience of these three steps, in the preferred embodiment, initial movement of the ejector plate energizes the power unit for low speed operation and further movement of the plate engages a cam follower with a cam surface. Then, release of the ejector plate and its return to normal position again turns off the power unit.

Referring to Figs. 8 through 11, there is shown a preferred embodiment of the invention as applied to a household mixer of a somewhat different type from the mixer described in connection with the above description. As in the previous embodiment, power unit 51 is supported on a suitable arm 52 which, in turn, may be integral with a base (not shown). A suitable handle 53 may be provided for convenience in handling the mixer when it is removed from the supporting arm and base. Power unit 51 may be arranged to drive any suitable number of beater elements, and is here shown as including three driving spindles 15 for supporting and driving three beater elements, the shafts of which are indicated as 12, 13 and 14. It is to be understood that the spindle construction used in this embodiment is substantially the same as that previously described and shown by Fig. 3. Hence, in Fig. 8 there is shown only a portion of one spindle 15 along with spindle collar 20, which encloses the slotted end portion of the spindle and the resilient retaining ring. Obviously, any of the numerous arrangements well known in the art may be used for retaining each of the beater shafts in operative driving relation with respect to the power unit.

In the present instance, the starting switch and speed control for the power unit are operated by a knob 54. This particular arrangement for the starting switch and adjustable speed control is illustrated by way of example and forms no part of the present invention. In particular, this speed control mechanism is disclosed and claimed in the copending application, Serial No. 77,746, filed February 23, 1949, patented June 19, 1951, No. 2,557,765, and assigned to the assignee of the present invention. Only sufficient details are given here for a proper understanding of the present invention.

A conventional motor (not shown) included within power unit 51 has an outwardly extending shaft 55. The rotary speed of the motor is controlled by a pair of contacts 56 and 57 connected in series circuit relation with the motor. Contact 57 is affixed to the power unit casing in any suitable manner as a stationary contact, while contact 56 is supported on a resilient arm 58. Contacts 56 and 57 are opened or closed in accordance with the relative value of two opposed forces acting upon spring member 58. One force tending to retain the contacts closed is supplied by a helical spring 59 positioned between a pair of cup-shaped spring bearing members 60 and 61 of fiber or other electrical insulating material. An opposing force on the other side of spring 58, tending to open the contacts, is provided by a centrifugal governor assembly 62 affixed to the end of motor shaft 55. While not here described in detail, this governor applies an increasing force tending to open contacts 56 and 57 upon an increase in the rotary speed of shaft 55. When the force applied by governor 62 to spring arm 58 is greater than the force applied by spring 59, contacts 56 and 57 are open and the electrical power supply to the motor driving shaft 55 is interrupted. When the force of governor 62 becomes less than that of spring 59, contacts 56 again move to the closed position, energizing the motor. Thus, the relative value of the two forces is used to regulate the speed of shaft 55.

The adjustment knob 54, which is rotatably mounted on the end of the power unit, has attached thereto a speed adjusting cam 63. As can be seen in Fig. 8, the outer end of the cup 60 for spring 59 rides on the sloping surface of cam 63. Thus, it may be seen that rotation of knob 54, which, in turn, adjusts the position of cam 63, is effective to vary the force exerted by spring 59 on the resilient supporting arm of the movable contact 56.

The on-off control for the power unit results from the use of a second pair of contacts 64 and 65 intended to be placed in series circuit relation with the motor. Contact 65 is fixed in position, and may be supported in any suitable manner on the casing of the power unit, as, for example, on bracket 66. Movable contact 64 is adjacent the outer end of a spring arm 67 having its fixed end attached to the power unit casing at 68. The resilient bias of arm 67 normally tends to retain contacts 64 and 65 open corresponding to the inoperative or "off" position for the power unit. However, the free end of arm 67 is in contact with an operating pin 69 of suitable insulating material. This operating pin is in the position shown in Fig. 9 when control knob 54 is in its "off" position. Any suitable arrangement may be employed for forcing pin 69 to the right to close contacts 64 and 65 when the control knob is rotated from its "off" position. As described in the above mentioned Patent No. 2,557,765, this is accomplished through the use of a cam surface on the inner side of control knob 54 against which pin 69 rides.

As in the previously described embodiment, an ejector plate 70 is slidably attached to the under surface of the power unit. This ejector plate, as shown in perspective in Fig. 11, may be fabricated from sheet metal, and includes a convenient finger operating portion 71 curved to blend with the outline of the power unit casing. A pair of upwardly extending flanges 72 and 73 are adapted to move in slots in the power unit casing to guide the motion of the ejector plate. A pair of elongated slots 74 and 75 permit the slidable mounting of the forward end of this plate to the power unit by shouldered screws 76 and 77, as shown in Fig. 10. The rear end of the ejector plate, that is, the end opposite finger operating portion 71, is formed with an offset flange 78, which may ride on an inner surface 79 of the power unit casing, as shown in Fig. 8. A suitable elongated aperture 80 may be provided in the motor casing to permit this mounting. In addition, an offset tongue 81 may be included on this end of the ejector plate to receive any suitable resilient means, such as a spring 82, to bias the ejector plate into its normal inoperative position. As in the previously described embodiment, a plurality of elongated apertures 83, 84 and 85 may be located in the body of the ejector plate, through which the beater shafts 12, 13 and 14 respectively may extend. In forming these elongated apertures, projecting portions 86, 87 and 88 are created, for example, in the shape of a loop, as shown in Fig. 10. Thus, a rounded end portion 89 is provided, similar to the rounded end portion 46, as shown in Fig. 6.

In the illustrated embodiment, cam surfaces are provided by the members 38, 39 and 40 affixed to the beater shafts 12, 13 and 14 respectively. By way of example, there has been shown these members as identical with the correspondingly numbered members shown on Fig. 5 and described above. These cam surfaces cooperate with cam followers 86, 87 and 88 respectively, formed from the material making up the ejector plate. Obviously, other types of cam surfaces and cam followers may be used within the scope of this invention. For example, the threaded cam surfaces indicated by Fig. 7 with the thread engaging cam followers on the ejector plate might equally well be employed in this embodiment. In any case, the arrangement is intended to provide a cam follower which may be positioned with respect to a cam surface whereupon rotation of the associated beater shaft forces an ejection of the beater shaft from the resilient retaining means within the spindle of the power unit.

As explained above, it is desirable that the operation of pressing inwardly on the finger operating portion 71 not only shift the ejector plate laterally to engage the cam followers with their respective cam members, but also energize the power unit on a low speed which effectively releases the beater shafts. In this connection, it may be pointed out that the governor speed control and adjusting mechanism described above maintains contacts 56 and 57 closed when the power unit is not in operation. As explained above, a separate switch, including contacts 64 and 65, is provided for the on-off control. Therefore, with control knob 54 adjusted to the off position, if contacts 64 and 65 are closed, the power unit will commence operation at a very low speed. Since the governor setting corresponding to the off position of the control knob is for a low speed, such a speed will be maintained. Therefore, to close contacts 64 and 65, an operating arm 90 is secured to ejector plate 70 at 91, for example, by spot welding or other similar means. This operating arm 90, as shown most clearly in Fig. 8, extends upwardly within the casing of the power unit, so that its upper end is in proximity to the resilient arm 67 carrying contact 64.

From the above description, operation of this beater ejector becomes apparent. Upon completion of a mixing operation, control knob 54 is rotated to its off position, permitting pin 69 to move laterally followed by opening of contacts 64 and 65 under the influence of resilient arm 67. Thereafter, pressure applied to finger operating portion 71 of the ejector plate moves it laterally to the right, as shown in Figs. 8 and 9, whereupon arm 90 again forces contact 64 into circuit making position with contact 65. Hence, the power unit commences operation at a low speed. This same motion of the ejector plate simultaneously positions the projecting portions, or cam followers 86, 87 and 88 over the cam surfaces provided by the members 38, 39 and 40, respectively, secured to the beater shafts. Thereupon, rotation of the beater shafts and, hence, the cam members, results in a downward force on each beater shaft which effectively disengages these shafts from their operative driving engagement with the spindles of the power unit. Upon release of the ejector plate, it is spring returned to its normal inoperative position, in which it interferes in no way with normal operation of the mixer.

From the above description, it is seen that there has been disclosed a simple, yet efficient arrangement for detaching the beaters from the power unit of a mixer. In each instance, an ejector plate is employed, along with members affixed to the beater shafts, these members and the ejector plate forming respective cam surfaces and cam followers operative to eject the beater elements. Furthermore, in the preferred embodiment, the simple operation of moving the ejector plate laterally serves simultaneously to energize the power unit so that its motive power is utilized to eject the beaters.

While the present invention has been described by reference to particular embodiments thereof, it is to be understood that numerous modifications may be made by those skilled in the art without actually departing from the invention. It is, therefore, aimed in the appended claims to cover all such equivalent variations as come within the true spirit and scope of the foregoing disclosure.

What is claimed as new and desired to be secured by Letters Patent of the United States is:

1. In a household mixer, a power unit including a driven spindle, a beater element having a shaft receivable in telescopic driving relation with said spindle, resilient means for retaining said shaft in said driving relation with said spindle, and an ejector to release said shaft from said resilient retaining means, said ejector comprising a plate slidably mounted on said power unit adjacent said spindle to move in a plane at right angles to the axis of said shaft, a projecting portion on said plate, a member on said shaft in a position adjacent said spindle when said shaft is in operative engagement with said spindle, said projecting portion and said member being shaped to form an upwardly sloping cam and cam follower structure engageable by a lateral sliding movement of said plate to eject said shaft from engagement with said spindle.

2. In a household mixer, a power unit including a driven spindle, a beater element having a shaft receivable in said spindle, resilient means for retaining said shaft in said spindle in operative driving relation, and an ejector to release said shaft from said resilient retaining means, said ejector comprising a plate slidably mounted on said power unit adjacent said spindle to move in a plane at right angles to the axis of said shaft, a projecting portion on said plate, a member affixed to said shaft in a position adjacent said spindle when said shaft is in operative engagement with said spindle, said projecting portion and said member being shaped to form an upwardly sloping cam and cam follower structure engageable by a lateral sliding movement of said plate to eject said shaft from engagement with said spindle, and resilient means normally maintaining said plate in an inoperative position.

3. In a household mixer having a power unit, a plurality of beaters having vertically disposed shafts supported from said power unit in spaced relation, resilient means for retaining said shafts in driving relation on said power unit, and a beater ejector carried by said power unit, said ejector comprising a plate slidably attached to said unit for lateral reciprocating movement and having a finger operating portion, a cam member having an upwardly sloping cam surface affixed to each of said shafts adjacent its point of attachment to said power unit, said plate including a projecting cam portion adjacent each of said cam members adapted by lateral movement of said plate to be positioned in the path of movement of said cam members when said shafts are rotated, and resilient means biasing said plate to a position in which said cam portions are positioned out of the path of movement of said cam members, lateral movement of said plate serving to bring said cam portions into the path of movement of said cam members whereby turning movement of said shafts serves to effect axial movement of said shafts to eject the beaters from the power unit.

4. In a household mixer having a power unit for driving at least one beater element carried on the end of a downwardly depending shaft and means for retaining said beater element shaft in operative driving relation on said power unit, an ejector for detaching said shaft from said power unit comprising an ejector plate slidably mounted on the under surface of said power unit to move in a plane at right angles to the axis of said shaft, a member affixed to each said shaft, and a portion on said ejector plate adapted to engage said member, said member and said portion presenting a vertically sloping surface to each other to force said shaft downwardly upon a lateral movement of said plate.

5. An electric mixer of the household type comprising a power unit, at least one beater having a vertically disposed shaft supported from said power unit, resilient means for retaining said shaft in operative driving relation on said power unit, and a beater ejector manually operating to remove said beater shaft from said power unit, said beater ejector including a plate slidably mounted on said power unit for lateral reciprocating movement in a plane at right angles to the axis of said shaft, an annular flanged member affixed to said shaft which presents an upwardly facing annular edge adjacent said plate, said plate including a vertical sloping portion normally out of engagement with said annular edge in one position of said plate and movable against said annular edge to force it downwardly to eject said shaft from said power unit when said plate is moved laterally to another position.

6. In an electric household mixer having a power unit including a plurality of driving spindles, a plurality of beaters having vertically disposed shafts supported from said power unit, resilient means for retaining said shafts in operative driving relation with respective ones of said spindles, and ejector means for releasing said shafts from said resilient retaining means, said ejector means comprising an ejector plate mounted on the under surface of said power unit for lateral reciprocating motion with respect thereto in a plane at right angles to the axes of said shafts, an annular flanged member affixed to each of said shafts adjacent its corresponding spindle, said ejector plates having a substantially flat portion normally positioned between each of said flanged members and said power unit, and downwardly sloping surfaces extending from each of said flat portions of said plate engageable with respective ones of said annular flanged members upon a lateral movement of said plate, whereby said shafts are forced downwardly out of engagement with said spindles by the lateral motion of said plate.

7. In an electric mixer including a power unit and a power driven spindle, a beater having a vertically disposed shaft receivable in said spindle, resilient means retaining said shaft in operative driving relation in said spindle, and a beater ejector for removing said shaft from said spindle comprising a cam member affixed to said shaft having an upwardly sloping cam surface, an ejector plate slidably mounted on said power unit for lateral reciprocating motion in a plane at right angles to the axis of said shaft, a downwardly extending cam follower on said plate, said plate having a first position in which said cam follower is out of the path of movement of said cam surface and a second position in which said cam follower stands in the path of movement of said cam surface when said shaft is rotated, whereby operation of said power unit when said plate is in said second position causes a downward movement of said member and correspondingly of said shaft to eject the beater from engagement with said spindle.

8. In a household mixer, a power unit including a driven spindle, a beater element having a shaft receivable in said spindle, resilient means for retaining said shaft in said spindle in operative driving relation, and ejecting means to release said shaft from said resilient retaining means, said ejecting means comprising a threaded portion on said shaft, an ejector plate slidably mounted on said power unit for lateral reciprocating motion, said ejector plate including a thread engaging tongue movable into and out of engagement with the threaded portion of said shaft, whereby when said tongue is in engagement with said shaft subsequent operation of said power unit forces said beater shaft downwardly to release it from said resilient retaining means.

9. In a household mixer, a power unit including a driven spindle, a beater element having a shaft receivable in said spindle, resilient means for retaining said shaft in said spindle in operative driving relation, and ejecting means to release said shaft from said resilient retaining means, said ejecting means comprising a threaded portion on said shaft, an ejector plate slidably mounted on said power unit for lateral reciprocating motion, said ejector plate including a thread engaging tongue movable into and out of engagement with the threaded portion of said shaft, whereby when said tongue is in engagement with said shaft subsequent operation of said power unit forces said beater shaft downwardly to release it from said resilient retaining means, and resilient means normally retaining said thread engaging tongue out of engagement with said threaded portion.

10. In an electric mixer, a power unit including a driven spindle, a beater element having a shaft receivable in said spindle, resilient means for retaining said shaft in said spindle in operative driving relation, and a beater ejector manually operable to force said shaft out of engagement with said spindle, said ejector comprising a flanged member affixed to said beater shaft and having an upper cam surface, an ejector plate slidably mounted on said power unit and having a downwardly extending tongue co-operable as a cam follower with said cam surface when said plate is in one position, switch means operable to closed position to energize said power unit, and means carried by said plate for closing said switch means on movement of said plate to said cam and cam follower engaging position.

11. A household mixer comprising a power unit, a plurality of beaters having vertically disposed shafts supported from said power unit in spaced relation, resilient means for retaining said shafts in operative driving relation on said power unit, a switch for energizing said power unit, and a beater ejector comprising a plate slidably mounted on said unit for lateral reciprocating movement, a member affixed to each of said shafts adjacent its point of attachment to said power unit and having a cam surface, said plate including a portion adjacent each said member forming a cam follower, whereby lateral movement of said plate engages said cam followers of said cam surfaces, and means carried by said plate for operating said switch to closed position whereby rotation of said shafts ejects said beaters.

WILLIAM A. ROBERTSON,
*Executor of the Estate of Alastair Robertson, Deceased.*

REFERENCES CITED

The following references are of record in the file of this patent:

UNITED STATES PATENTS

| Number | Name | Date |
|---|---|---|
| 2,048,455 | Knapp | July 21, 1936 |
| 2,093,534 | Wright | Sept. 21, 1937 |
| 2,098,098 | Jepson | Nov. 2, 1937 |
| 2,293,959 | Wright | Aug. 25, 1942 |
| 2,325,434 | Stiles | July 27, 1943 |